United States Patent
White (10) Patent No.: US 8,776,133 B2
(45) Date of Patent: Jul. 8, 2014

(54) SYSTEM FOR PRESENTING AN ELECTRONIC PROGRAMMING GUIDE IN A MEDIA SYSTEM

(75) Inventor: Scott White, Austin, TX (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 680 days.

(21) Appl. No.: 11/777,359

(22) Filed: Jul. 13, 2007

(65) Prior Publication Data

US 2009/0019483 A1 Jan. 15, 2009

(51) Int. Cl.
H04N 5/445 (2011.01)

(52) U.S. Cl.
USPC .................................. 725/52; 725/39; 725/53

(58) Field of Classification Search
CPC .................. H04N 21/42204; H04N 21/42216; H04N 21/431; H04N 21/4314
USPC ...................................................... 725/37–61
See application file for complete search history.

(56) References Cited

U.S. PATENT DOCUMENTS

| | | | |
|---|---|---|---|
| 5,241,308 A * | 8/1993 | Young ............................ | 341/34 |
| 5,880,768 A * | 3/1999 | Lemmons et al. .............. | 725/41 |
| 6,018,372 A * | 1/2000 | Etheredge ...................... | 725/44 |
| 6,034,677 A * | 3/2000 | Noguchi et al. ............... | 715/719 |
| 6,177,931 B1 * | 1/2001 | Alexander et al. ............. | 725/52 |
| 7,134,133 B1 | 11/2006 | Wugofski | |
| 7,224,409 B2 * | 5/2007 | Chin et al. ..................... | 348/732 |
| 2002/0010932 A1 * | 1/2002 | Nguyen et al. ................. | 725/51 |
| 2004/0216156 A1 * | 10/2004 | Wagner ........................... | 725/39 |
| 2004/0218104 A1 * | 11/2004 | Smith et al. .................... | 348/734 |
| 2005/0010947 A1 * | 1/2005 | Ellis ................................ | 725/38 |
| 2005/0021522 A1 * | 1/2005 | Herman et al. ................. | 707/10 |
| 2005/0091693 A1 * | 4/2005 | Amine et al. ................... | 725/100 |
| 2005/0102634 A1 * | 5/2005 | Sloo ............................... | 715/823 |
| 2005/0108751 A1 * | 5/2005 | Dacosta .......................... | 725/39 |
| 2006/0095472 A1 * | 5/2006 | Krikorian et al. .............. | 707/104.1 |
| 2007/0061831 A1 * | 3/2007 | Savoor et al. ................... | 725/13 |
| 2007/0083895 A1 * | 4/2007 | McCarthy et al. .............. | 725/46 |
| 2008/0010653 A1 * | 1/2008 | Ollikainen et al. ............. | 725/25 |
| 2008/0168523 A1 * | 7/2008 | Ansari et al. ................... | 725/131 |

* cited by examiner

*Primary Examiner* — Nicholas Corbo (74) *Attorney, Agent, or Firm* — Guntin & Gust, PLC; Andrew Gust (57) ABSTRACT

A system for presenting an electronic programming guide in a media system is disclosed. A system that incorporates teachings of the present disclosure may include, for example, an Internet Protocol Television (IPTV) media receiver having a controller element to transmit to a portal information associated with an Electronic Programming Guide (EPG). The portal processes the information to present a Graphical User Interface (GUI) window corresponding to a slideable canvas of the EPG in an Internet browser of a communication device requesting the EPG. Other embodiments are disclosed.

22 Claims, 11 Drawing Sheets

| | 1:00 PM | 1:30 PM | 2:00 PM | 2:30 PM |
|---|---|---|---|---|
| 287 RAVE | Soundstage | | ???????? Festival 2005 | |
| 298 FREE | ◄ Preview Showroom Channels 280-298 | | | ► |
| 299 REELZ | The Directors | | Dalles | What it Takes |
| 300 HBO-E | ◄ Son of the Mask | | | Clear and Present Danger ► |
| 301 HBO2E | ◄ City Slickers II: Legend of... | Marble | | Being Julia ► |
| 302 HBOSG | ◄ Mother's Boys | | The Hamburg Cell | ► |
| 303 HBO-W | ◄ In Good Company | | Guilty by Suspicion | ► |
| 304 HBO2W | ◄ Walk the Line | | | City Slickers II: Legend of... ► |

Guide | My Recordings  [Search within Television] [Search]
Thursday 10:05  [Select Day▼] [Select Custom Guide▼]
Jump To: Current Time | Prime Time | Channel # [ ][Go] Local Time 01:26:23 PM
► Symbol Legend

FIG.9

| | 1:00 PM | 1:30 PM | 2:00 PM | 2:30 PM |
|---|---|---|---|---|
| 7 KTBC | Judge Joe Brown | Cristina's Court | Divorce Court | Judge Joe Brown |
| 10 KLRV | Keeping Kids Healthy | Sesame Street | | Teletubbies |
| 24 KVUE | One Life to Live | | General Hospital | |
| 36 KXAN | Passions | | Montel Willams | |
| 42 KEYE | As the World Turns | | Guiding Light | |
| 54 KNVA | Maury | | The Bernie Mac Show | One on One |
| 62 KAKW | El Amor no Tiene Precio | | Rebeide | |
| 101 DNFYI | DISH NETWORK FYI | | DISH NETWORK FYI | |

Guide | My Recordings  [Search within Television] [Search]
Thursday 10:05  [Select Day▼] [Select Custom Guide▼]
Jump To: Current Time | Prime Time | Channel # [ ][Go] Local Time 01:23:49 PM
► Symbol Legend

SYSTEM FOR PRESENTING AN ELECTRONIC PROGRAMMING GUIDE IN A MEDIA SYSTEM

FIELD OF THE DISCLOSURE

The present disclosure relates generally to media services and more specifically to a system for presenting an electronic programming guide in a media system.

BACKGROUND

Current implementations of Electronic Programming Guides (EPGs) are typically presented in a flat graphical user interface. Navigating through listings of media channels and their respective media programs in an EPG can be cumbersome. Consequently, some subscribers resort to navigating between media channels until they find a program of interest, which can be inefficient and frustrating.

A need therefore arises for a system for presenting an electronic programming guide in a media system.

DETAILED DESCRIPTION

Broadly stated, embodiments in accordance with the present disclosure provide a system for presenting an electronic programming guide in a media system.

In one embodiment of the present disclosure, a computer-readable storage medium in a portal can have computer instructions for receiving a request from a communication device to access an Electronic Programming Guide (EPG) by way of a Set-Top Box (STB) operating in an Internet Protocol Television (IPTV) media system, establishing broadband communications with the STB by way of a gateway coupled to the STB, receiving from the STB information associated with the EPG, and presenting a Graphical User Interface (GUI) window corresponding to a slideable canvas of the EPG in an Internet browser of the communication device.

In one embodiment of the present disclosure, an IPTV media receiver can have a controller element to transmit to a portal information associated with an EPG. In another embodiment of the present disclosure, a gateway can have a controller element to provide the portal access to the EPG supplied by the IPTV media receiver. In both embodiments the portal can process the information to present a GUI window corresponding to a slideable canvas of the EPG in an Internet browser of a communication device requesting the EPG.

Figure 1:
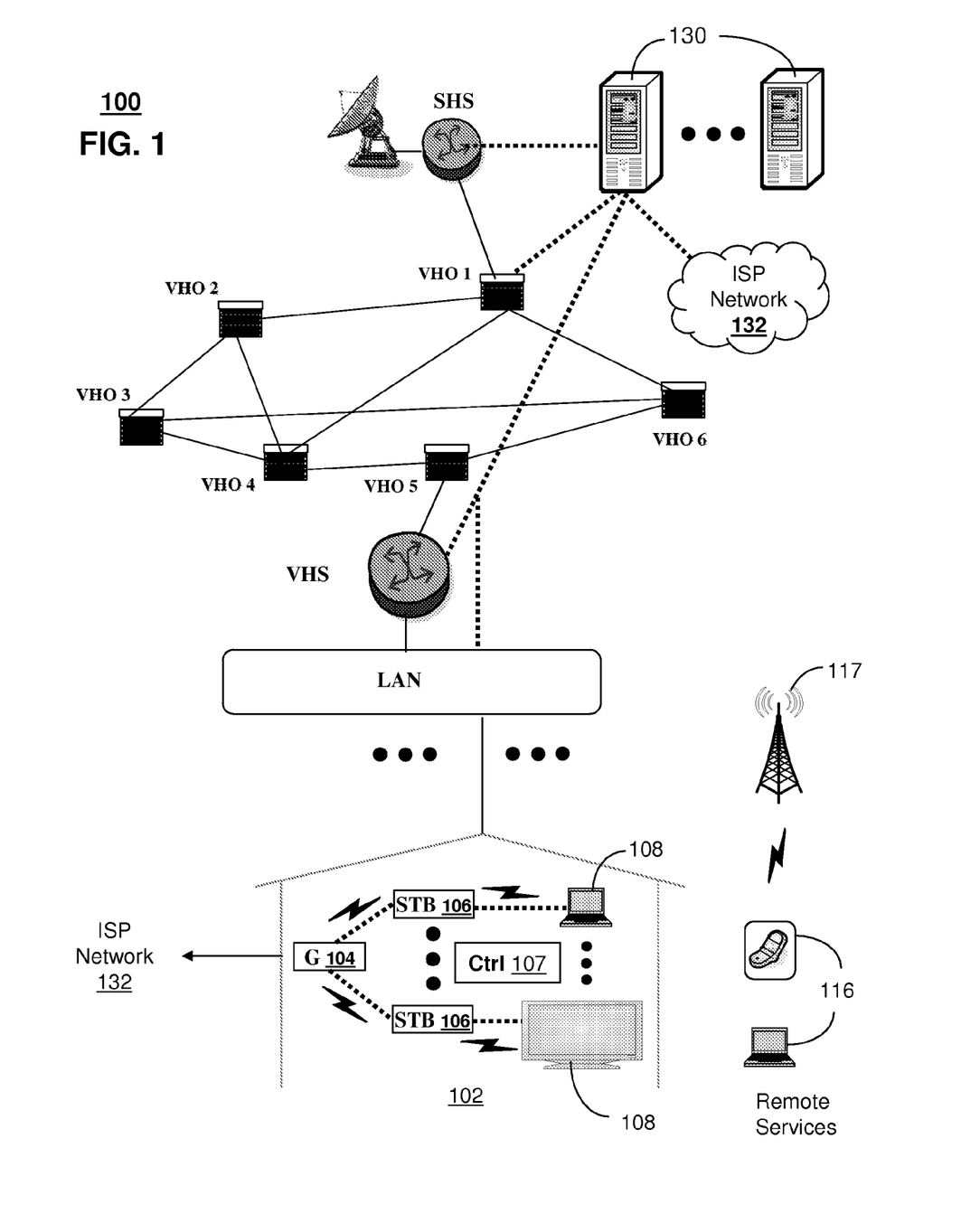
FIG. 1 depicts an exemplary embodiment of a communication system.

FIG. 1 depicts an exemplary embodiment of a communication system 100. The communication system 100 can represent an IPTV broadcast media system. In a typical IPTV infrastructure, there is at least one super head office server (SHS) which receives national media programs from satellite and/or media servers from service providers of multimedia broadcast channels. The SHS server forwards IP packets associated with the media content to video head servers (VHS) via a network of video head offices (VHO) according to a common multicast communication method.

The VHS then distributes multimedia broadcast programs to commercial and/or residential buildings 102 housing a gateway 104 (e.g., a residential gateway or RG). The gateway 104 utilizes common technologies to distribute broadcast signals to media receivers 106 such as Set-Top Boxes (STBs) which in turn present broadcast selections to media devices 108 such as computers or television units managed in some instances by a media controller 107 (e.g., an infrared or RF remote control). Unicast traffic can also be exchanged between the media receivers 106 and subsystems of the IPTV media system for services such as video-on-demand (VoD).

The IPTV media system can be coupled to one or more computing devices 130 that can operate as a web server for providing portal services over an Internet Service Provider (ISP) network 132 to fixed media devices 108 or portable communication devices 116 by way of a wireless base station 117 such as in a cellular communication network operating with common protocols (GSM, CDMA, GPRS, EVDO, UMTS, etc.). Access to the ISP network 132 can be based on a direct connection to said network, or by way of a unicast channel supplied by the IPTV media system. In both instances, the media receiver 106 can connect to either network by way of the gateway 104.

Figure 2:
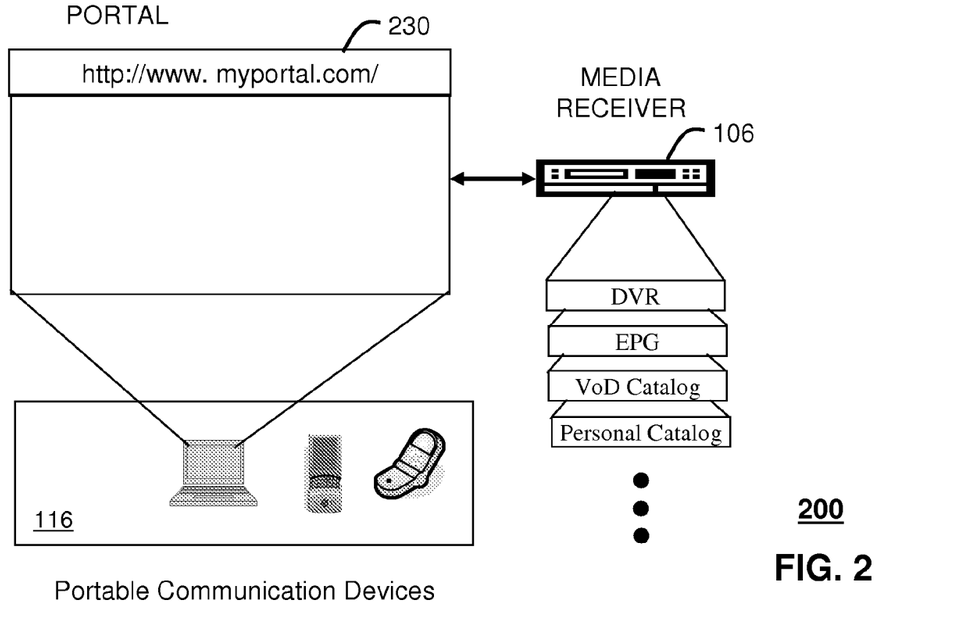
FIGS. 2-14 depict exemplary embodiments of a portal of the communication system.

FIGS. 2-14 depict exemplary embodiments of a portal 230 of the communication system 100. In FIG. 2, the portal 230 can be accessed by a URL with a common browser such as Microsoft's Internet Explorer. The portal 230 can be configured to access a media receiver 106 such as the STB of FIG. 1 to retrieve information associated with an Electronic Programming Guide (EPG). FIGS. 3-14 depict embodiments of a GUI window presented by the portal 230 at the Internet browser using HTML language for navigating through an EPG. The GUI window of FIGS. 3-14 illustrate a slideable canvas with a matrix depicting a plurality of media program channel IDs and call letters in a first column and corresponding media programs for each media program channel and their viewing times in rows.

The slideable canvas of the EPG can have a virtual view that is larger than the GUI window presented at the Internet browser. In this embodiment, the slideable canvas of the EPG can have more viewable data (e.g., weeks of media programs and their respective viewing times) than is presented by the GUI window. The GUI window in a sense acts as a virtual compass into the slideable canvas of the EPG. As the slideable canvas is panned in a particular direction the GUI window presents a different viewable portion of the EPG that was previously hidden.

A number of GUI control elements can be placed in borders of the GUI window to control the portion of the EPG presented in the GUI window. For example, the GUI window can have GUI control elements such as pan right and pan left GUI buttons for panning the slideable canvas to the left and right respectively (see FIGS. 3-4), pan up and pan down GUI buttons for panning the slideable canvas down and up respectively (see FIGS. 5-6). Alternatively, or in combination, the slideable canvas of the EPG can be panned in any direction by selecting and dragging the slideable canvas by way of a navigation element of the portable communication device 116. The navigation element can be for example a mouse with selection buttons, a disk or roller ball with selection features.

To pan in any direction, a navigation arrow or other symbol (e.g., a pointing finger of a hand) can be directed by common navigation means to a point in the portion of slideable canvas of the EPG exposed by the GUI window. Said location is then selected by the navigation element (e.g., depressing a mouse selection button). While holding down the selection button the slideable canvas can be moved within the confines of the GUI window in any direction of interest by the subscriber (much like the way maps are panned today in portals such as maps.google.com or mapquest.com).

Figure 7:
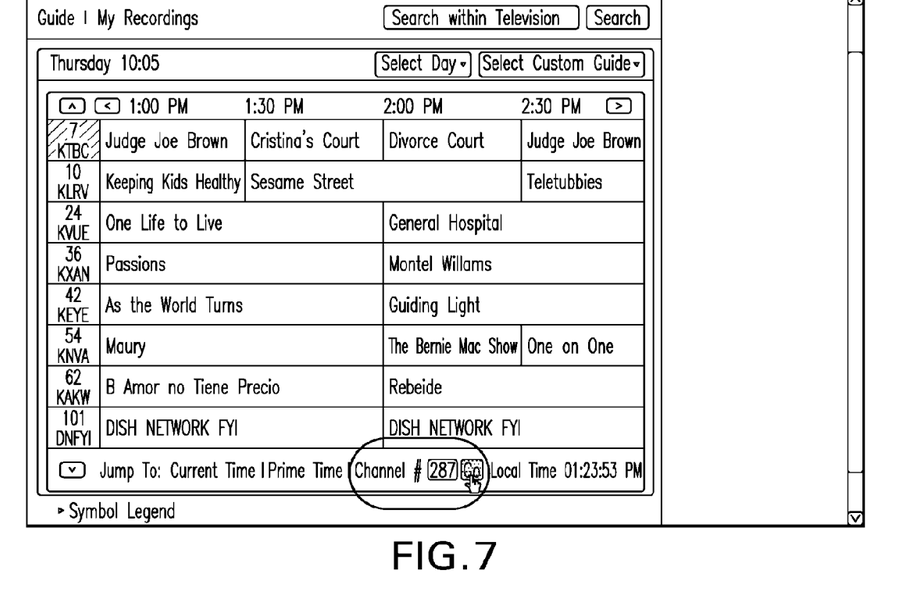
Figure 8:
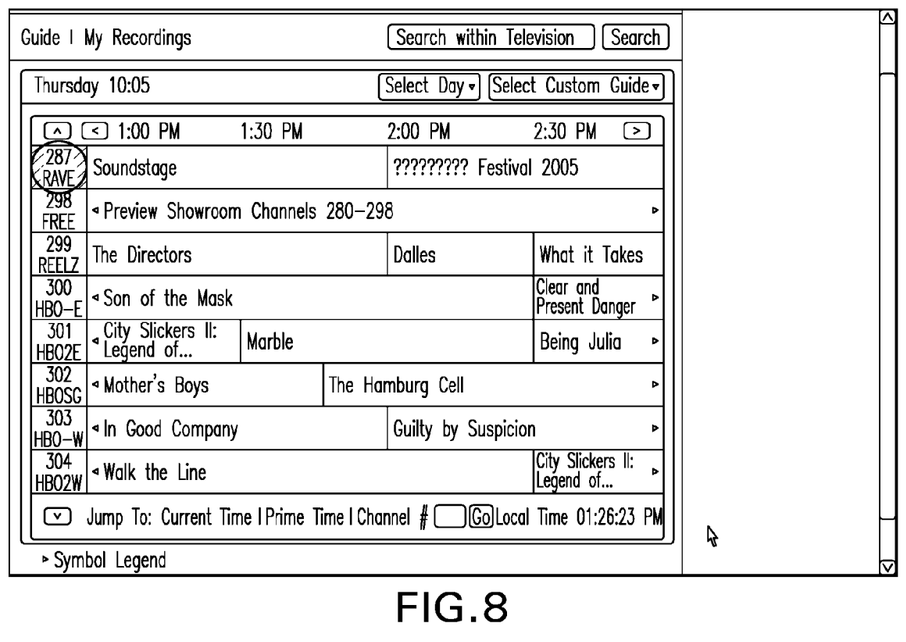
Figure 9:
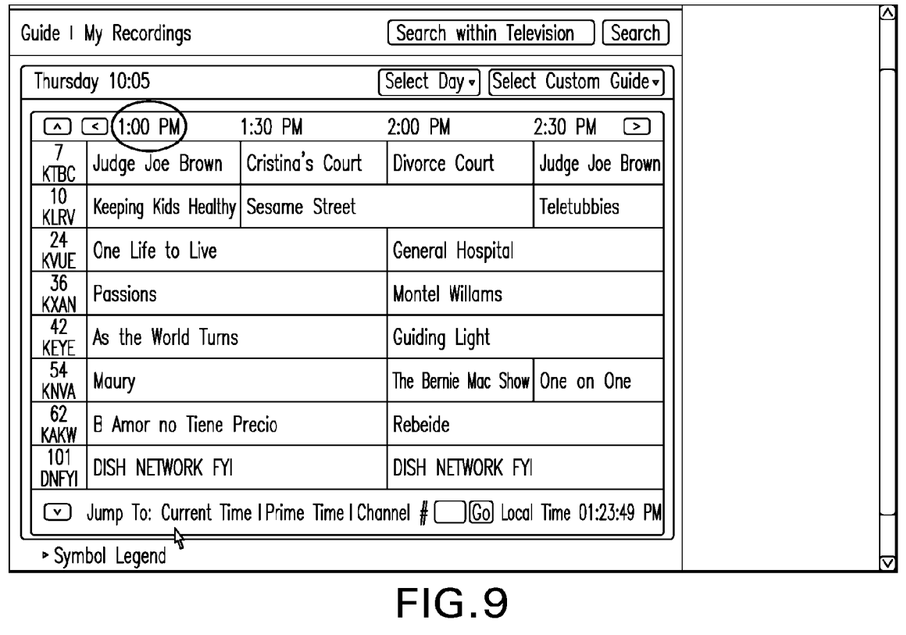
Figure 10:
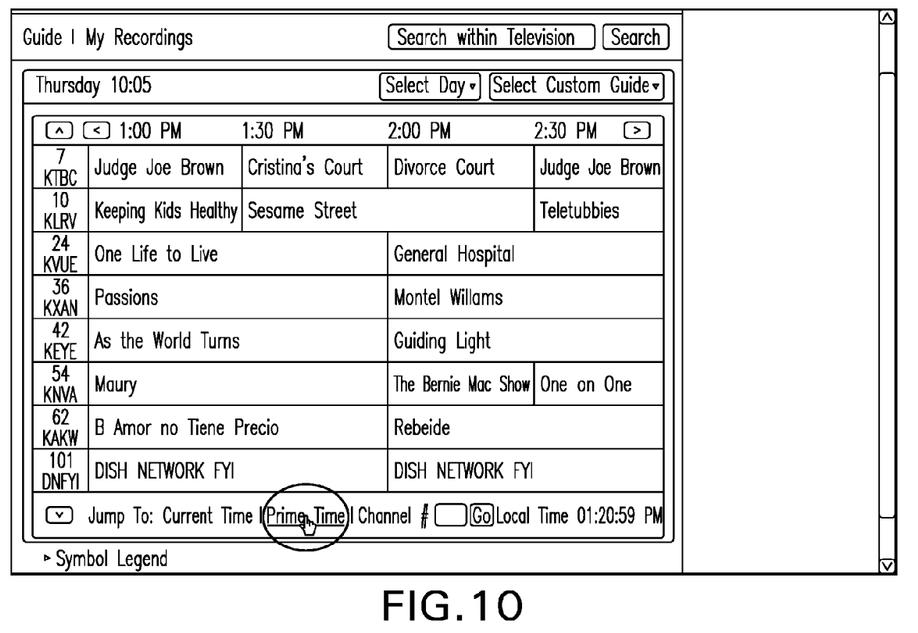
Figure 11:
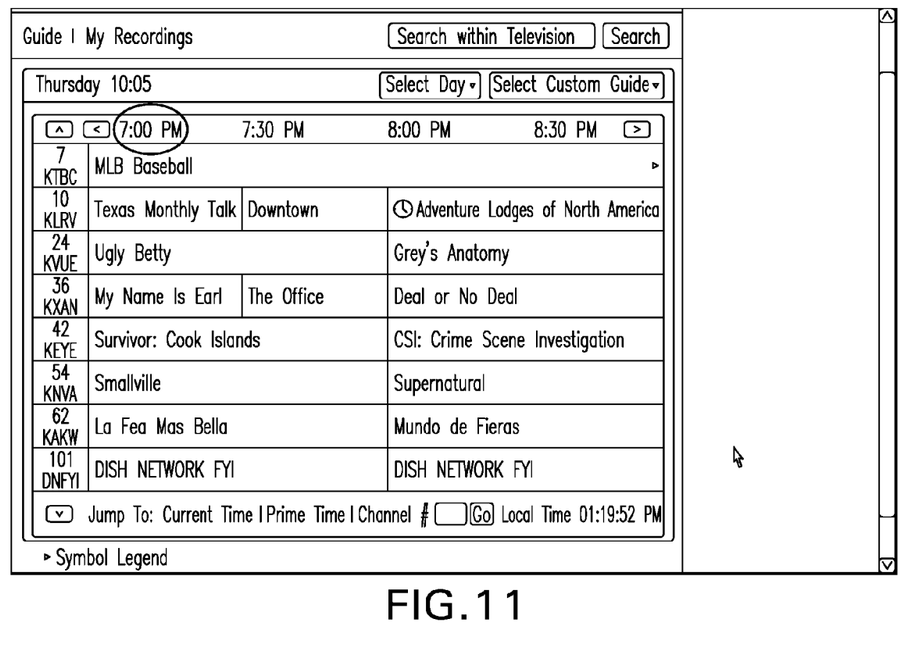
Figure 12:
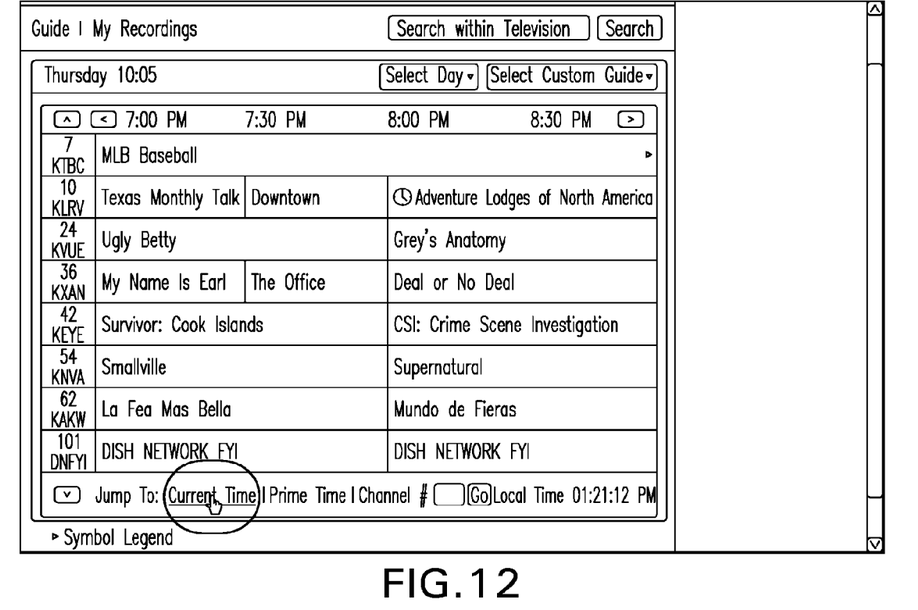
Figure 13:
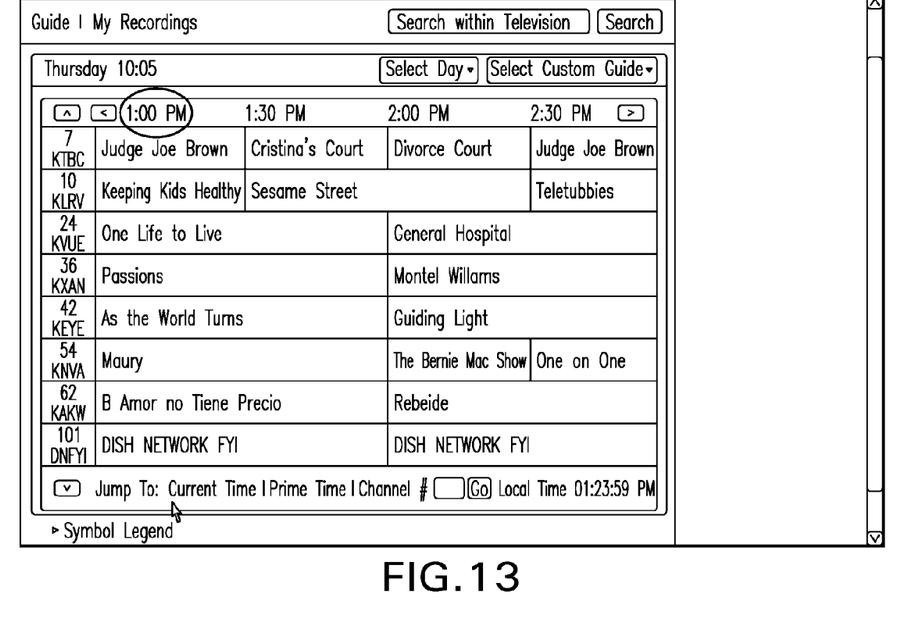
Figure 14:
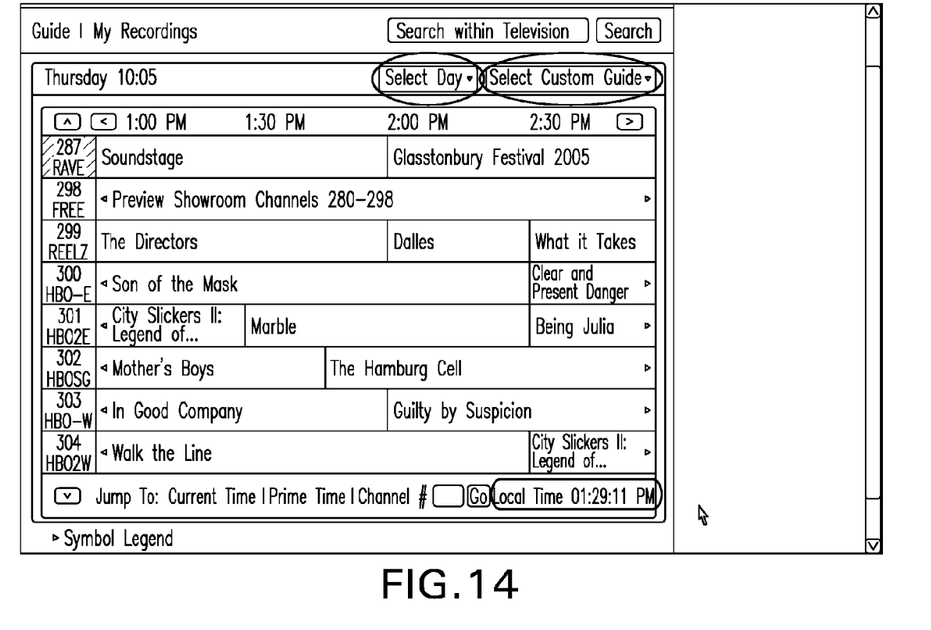

In another embodiment, the slideable canvas of the EPG can be panned by entering a channel number to jump to a portion of the EPG displaying said channel and channels above and below said channel (see FIG. 7). Alternatively, or in combination, call letters of the channel number can also be entered. In yet another embodiment, the slideable canvas can be panned from current time viewings (e.g., 1 pm—see FIG. 9) to prime time viewings (e.g., 7 pm—see FIGS. 10-11) and back (see FIGS. 12-13). In another embodiment, the slideable canvas can be panned by selecting a day of the week (or other calendar setting such a week or month) (see FIG. 14). In this embodiment, the subscriber can skip ahead in the EPG by a day or two. It would be apparent to one of ordinary skill in the art that the above panning methods can be applied singly or in combination.

Additionally, the subscriber can switch between customized EPGs with a drop-down menu (see FIG. 14) in which case the GUI window shows a slideable canvas of a new EPG that can be panned with any of the methods described above. For each of the foregoing panning methods, a current time of the media receiver can be presented at the bottom right of the GUI window to provide the subscriber a means to plan viewing times for DVR recordings or VoD downloads (see FIG. 14) while in transit in different time zones. It should also be noted that media programs can be selected from the slideable canvas of the EPG for viewing purposes. Thus while remotely browsing the slideable canvas of the EPG, a subscriber can point a navigation symbol (e.g., arrow) to a select media program of interest (e.g., Nickelodeon), "double-click" on the media program to direct the portal 230 to present the selected media program to the portable communication device 116 as streamed data supplied by the media receiver 106.

Figure 15:
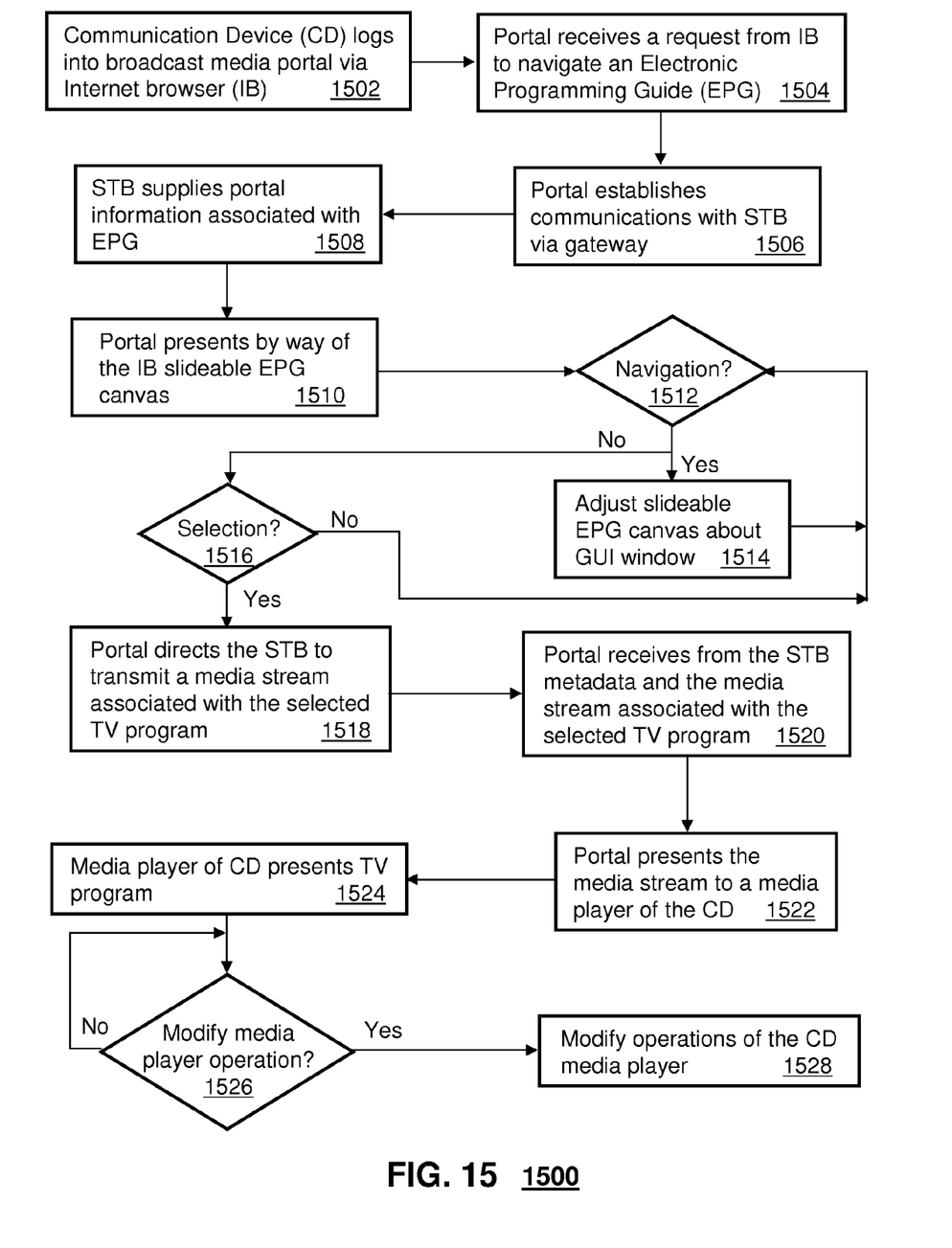
FIG. 15 depicts an exemplary method operating in portions of the communication system.

FIG. 15 depicts an exemplary method 1500 operating in portions of the communication system 100. Method 400 begins with step 1502 in which a portable communication device 116 roaming the communication system 100 of FIG. 1 (e.g., a cell phone or lap top) logs into a broadcast media portal 230 via an Internet browser. The computing devices 130 operate as a web server of the broadcast media portal serving a multiplicity of subscribers of the IPTV media system depicted in FIG. 1. The portal 230 can be accessed by common means (e.g., URL) and a subscriber account identified by a user's login information (e.g., username and password).

Once a subscriber has logged in, the portal 230 can be programmed to detect in step 1504 a request from the Internet browser 301 to navigate an EPG accessible by the media receiver 106. The request can arise from a selection of a GUI element in the portal 230 (e.g., a hypertext link or icon associated with the STB for accessing an EPG) which is presented when the user logs into the portal 230 in step 1502. In response to said request, the portal 230 can be programmed in step 1506 to establish communications with the STB by way of the gateway 104 using a unicast channel of the IPTV media system of FIG. 1. In this step, the portal 230 can supply authentication information to the gateway 104 to provide secure access to the STB 106.

Figure 3:
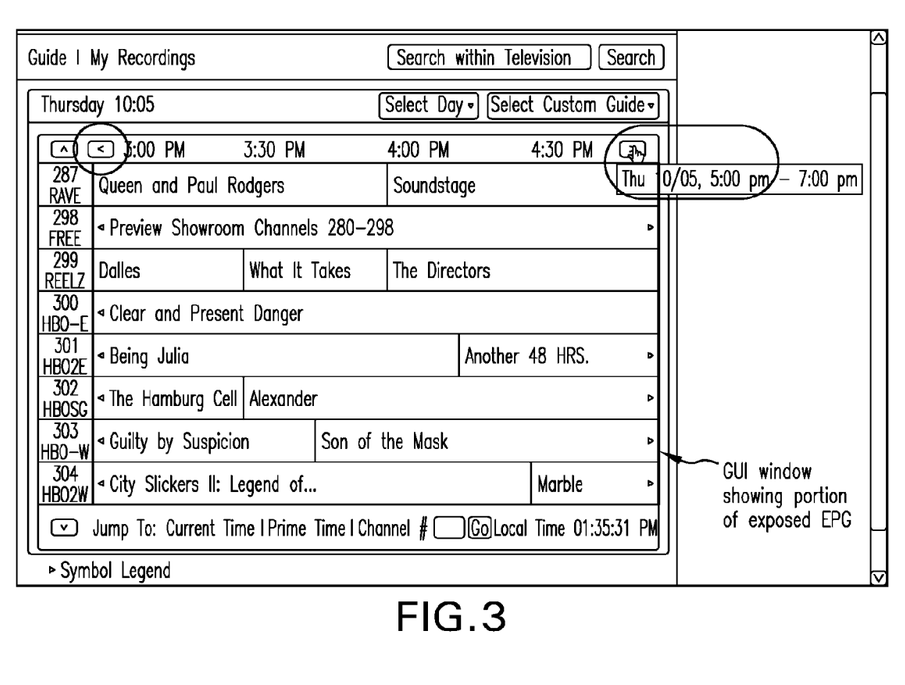
Figure 4:
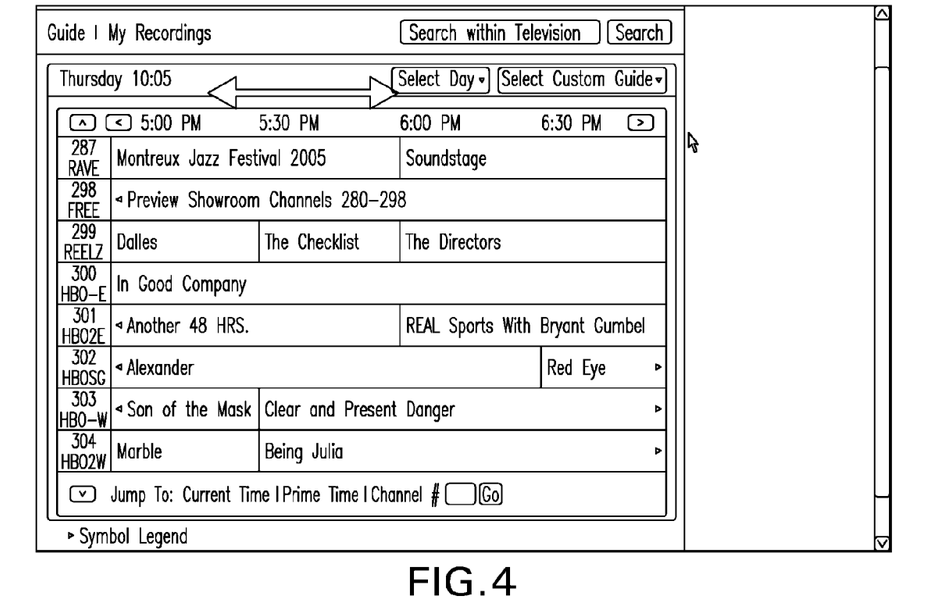
Figure 5:
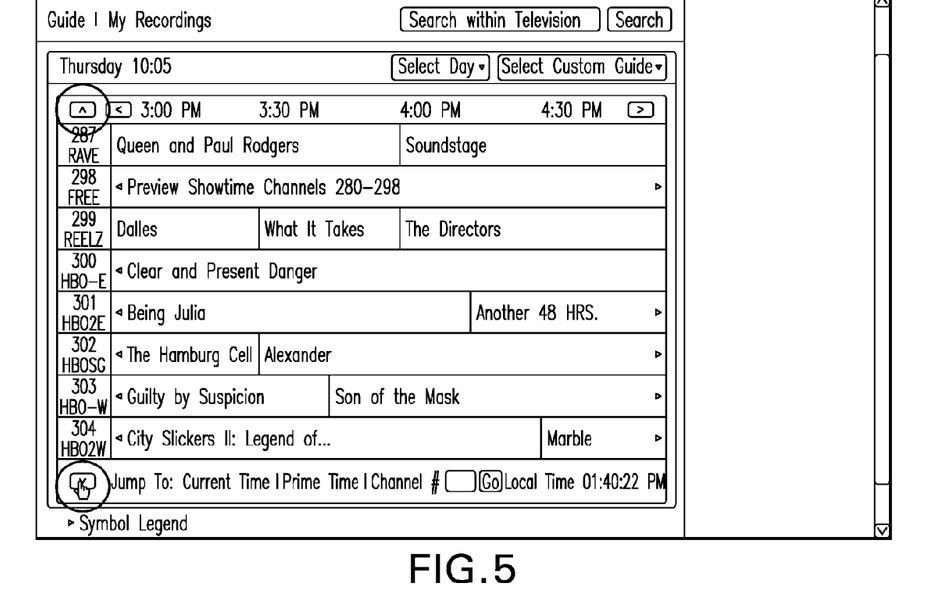
Figure 6:
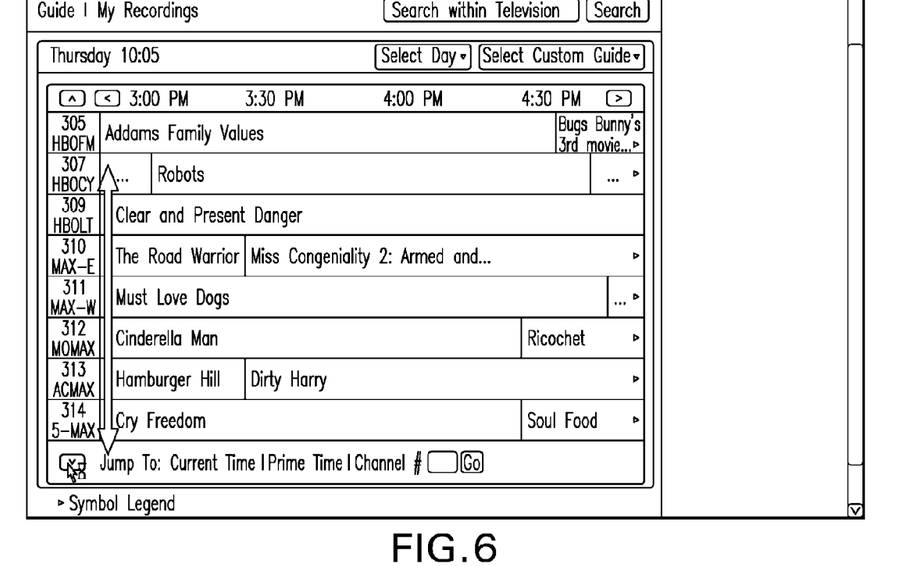

In step 1508, the Internet browser 301 receives information from the portal 230 for presenting in step 1510 the slideable canvas of the EPG by way of the GUI window of FIG. 3. The portal 230 can monitor for a navigation instruction associated with the EPG from the Internet browser 301 in step 1512. When a navigation instruction is detected, the portal 230 proceeds to step 1514 to direct the STB to adjust the slideable EPG canvas about the GUI window as described earlier. If the portal 230 detects something other than a navigation instruction, the portal 230 proceeds to step 1516. In step 1516 the portal 230 determines if a selection request has been made. If a selection is detected (e.g., double-click signal from a navigation element of the portable communication device 116), the portal 230 can determine if the selected item involves a media file that can be streamed to the subscriber's communication device 116. If for example the selected item is a TV program selected from the EPG that can be streamed, the portal 230 proceeds to step 1518; otherwise, the portal 230 proceeds back to step 1512.

If a streaming application can be invoked, the portal 230 proceeds to step 1518 where it directs the STB 106 to transmit a media stream associated with the selected TV program accessible by said STB. In step 1520 the portal 230 receives from the STB 106 metadata (if available) of the TV program and the media stream associated therewith. In step 1522, the portal 230 presents the media stream to a media player of the communication device 116 (e.g., Microsoft Windows Media Player™). The presentation can take place in step 1524 by way of a graphical user interface (GUI) window of the media player that can include among other things a video or still image presentation with text derived from the metadata (e.g., name of video, song, genre, actor names, media duration, media file date, etc.).

The communication device 116 can be programmed in step 1526 to modify in step 1528 the operation of the media player when detecting a selection associated with the GUI control elements (e.g., play, pause, fast forward, volume control, etc.). The media player can be programmed to buffer the media stream received from the portal 230 and begin the presentation immediately or upon selecting the play button. Selecting the pause button ceases presentation of the streamed media. Other buttons of the media player can perform well known functions.

Upon reviewing the aforementioned embodiments, it would be evident to an artisan with ordinary skill in the art that said embodiments can be modified, reduced, or enhanced without departing from the scope and spirit of the claims described below. For example, the GUI window can be adapted with additional GUI control elements to zoom in and out of the slideable EPG canvas. In this embodiment, as a subscriber zooms out of an EPG canvas, the GUI window shows a smaller print with a greater viewable portion of the slideable EPG canvas. Similarly, as the subscriber zooms into the EPG canvas, the print of the EPG becomes larger and the GUI window presents less of the slideable EPG canvas. Additionally, method 1500 can be modified so that instead of the STB streaming a media file to the portal 230, the media file is retrieved by the portal from the STB and processing resources of the portal are used to stream the media file to the communication device 116. Additionally, method 1500 can be applied to delivery systems such as cable and fiber communication systems employing principles of IPTV communications.

These are but a few examples of modifications that can be applied to the present disclosure without departing from the scope of the claims. Accordingly, the reader is directed to the claims section for a fuller understanding of the breadth and scope of the present disclosure.

Figure 16:
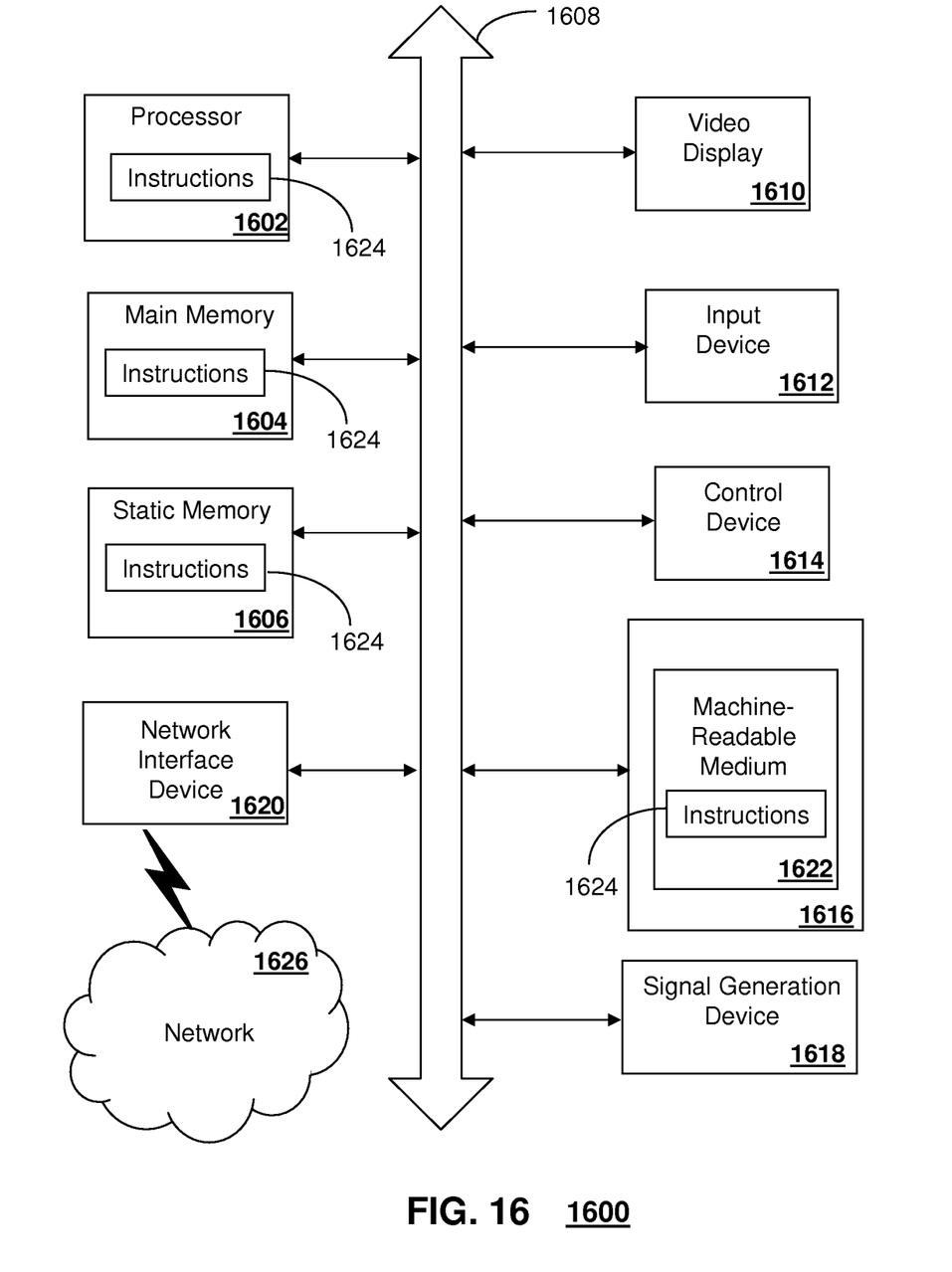
FIG. 16 is a diagrammatic representation of a machine in the form of a computer system within which a set of instructions, when executed, may cause the machine to perform any one or more of the methodologies discussed herein.

FIG. 16 depicts an exemplary diagrammatic representation of a machine in the form of a computer system 1600 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 1600 may include a processor 1602 (e.g., a central processing unit (CPU), a graphics processing unit (GPU, or both), a main memory 1604 and a static memory 1606, which communicate with each other via a bus 1608. The computer system 1600 may further include a video display unit 1610 (e.g., a liquid crystal display (LCD), a flat panel, a solid state display, or a cathode ray tube (CRT)). The computer system 1600 may include an input device 1612 (e.g., a keyboard), a cursor control device 1614 (e.g., a mouse), a disk drive unit 1616, a signal generation device 1618 (e.g., a speaker or remote control) and a network interface device 1620.

The disk drive unit 1616 may include a machine-readable medium 1622 on which is stored one or more sets of instructions (e.g., software 1624) embodying any one or more of the methodologies or functions described herein, including those methods illustrated above. The instructions 1624 may also reside, completely or at least partially, within the main memory 1604, the static memory 1606, and/or within the processor 1602 during execution thereof by the computer system 1600. The main memory 1604 and the processor 1602 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 1624, or that which receives and executes instructions 1624 from a propagated signal so that a device connected to a network environment 1626 can send or receive voice, video or data, and to communicate over the network 1626 using the instructions 1624. The instructions 1624 may further be transmitted or received over a network 1626 via the network interface device 1620.

While the machine-readable medium 1622 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A computer-readable storage device comprising computer instructions, which when executed by processor of a server hosting a portal, cause the processor to perform operations comprising:
    processing a request received from a communication device, the communication device in broadband communication with the portal via the Internet, the request to access an electronic programming guide by way of a set-top box having access to an interactive television system;
    providing authentication information to a gateway coupled to the set-top box;
    establishing broadband communications with the set-top box by way of the gateway based on the authentication information, wherein the gateway and the set top box are customer premises equipment;
    receiving from the set-top box updated information associated with the electronic programming guide;
    presenting a graphical user interface window corresponding to a slideable canvas of the electronic programming guide for display in an Internet browser of the communication device;
    monitoring for first navigation activity, second navigation activity and third navigation activity, wherein the first navigation activity includes a pan adjustment of the slideable canvas in a direction within confines of the graphical user interface window in combination with actuation of a control element of the communication device, wherein the second navigation activity includes first user input of call letters corresponding with a programming channel to enable the slideable canvas to be adjusted to present a section of the electronic programming guide corresponding to the programming channel, and wherein the third navigation activity includes second user input of a channel number to enable the slideable canvas to be adjusted to present a portion of the electronic programming guide corresponding to the channel number; and
    adjusting the slideable canvas of the electronic programming guide about the graphical user interface window responsive to detecting one of the first navigation activity, the second navigation activity or the third navigation activity.

2. The computer-readable storage device of claim 1, wherein the slideable canvas has a virtual view that is larger than the graphical user interface window presented at the Internet browser, wherein the graphical user interface window is defined by the portal according to a Hypertext Markup Language, and wherein the operations further comprise:
    responsive to the first, second and third navigation activity not being detected, determining whether there is a selection of a media program from the slideable canvas;
    responsive to the media program being selected, providing instructions to the set-top box to cause the set-top box to transmit a media stream associated with the media program to the processor via the broadband communication; and
    responsive to receiving the media stream from the set top box, providing the media stream via the Internet browser of the communication device for presentation.

3. The computer-readable storage device of claim 1, wherein the operations further comprise:
    presenting in the slideable canvas a matrix comprising a plurality of media program channel identifiers, a corresponding plurality of media programs for each of the plurality of media program channel identifiers, and a viewing time for each of the plurality of media programs.

4. The computer-readable storage device of claim 2, wherein the operations further comprise:
    responsive to the media program being selected, providing instructions to the set-top box to cause the set-top box to transmit metadata associated with the media program to the processor via the broadband communication.

5. The computer-readable storage device of claim 4, wherein the operations further comprise:
    obtaining descriptive information associated with the media program according to the metadata; and
    providing the descriptive information for presentation by the internet browser of the communication device.

6. The computer-readable storage device of claim 4, wherein the operations further comprise presenting at the graphical user interface window a plurality of graphical user interface control elements for panning the slideable canvas.

7. The computer-readable storage device of claim 6, wherein the plurality of graphical user interface control elements comprise a pan right graphical user interface button for panning the slideable canvas to the left, a pan left graphical user interface button for panning the slideable canvas to the right, a pan up graphical user interface button for panning the slideable canvas down, and a pan down graphical user interface button for panning the slideable canvas up.

8. The computer-readable storage device of claim 1, wherein the operations further comprise:
    zooming in and out of the slideable canvas.

9. The computer-readable storage device of claim 1, wherein the operations further comprise:
    presenting a graphical user interface element that presents a plurality of selectable electronic programming guides;
    receiving a selection associated with the plurality of selectable electronic programming guides, wherein the selection is based on user input; and
    replacing the slideable canvas of the electronic programming guide with a new slideable electronic programming guide canvas according to the selection.

10. The computer-readable storage device of claim 1, wherein the operations further comprise:
    presenting a graphical user interface element that presents a plurality of selectable days of the week;

receiving a selection associated with the plurality of selectable days, wherein the selection is based on user input; and adjusting the slideable canvas of the electronic programming guide according to the selection.

11. The computer-readable storage device of claim 1, wherein the operations further comprise:

presenting a prime time graphical user interface element;

detecting a selection of the prime time graphical user interface element, wherein the selection is based on user input; and adjusting the slideable canvas of the electronic programming guide to display in the graphical user interface window a portion of the slideable canvas associated with prime time viewings of media programs according to the selection.

12. The computer-readable storage device of claim 1, wherein the operations further comprise:

presenting a current time graphical user interface element;

detecting a selection of the current time graphical user interface element, wherein the selection is based on user input; and adjusting the slideable canvas of the electronic programming guide to display in the graphical user interface window a portion of the slideable canvas associated with current time viewings of media programs according to the selection.

13. The computer-readable storage device of claim 1, wherein the operations further comprise:

presenting a channel number graphical user interface window; and exchanging messages with the set-top box over a unicast channel of the interactive television system.

14. The computer-readable storage device of claim 1, wherein the operations further comprise presenting a local time from which the set-top box is operating, wherein the actuation of the control element comprises a depression of a selection button of the communication device.

15. The computer-readable storage device of claim 1, wherein the interactive television system comprises at least one among a super head office server coupled to a network of video head office servers and video head servers.

16. The computer-readable storage device of claim 15, wherein the operations further comprise exchanging messages with the set-top box over a unicast channel of the interactive television system.

17. A media receiver, comprising:

an interface element; and a controller element coupled with the interface element to transmit information that is associated with an electronic programming guide to a server hosting a portal and to transmit a media stream associated with a selected media program to the server for presentation at a communication device, wherein the presentation of the information comprises display of a graphical user interface window that includes a slideable canvas of the electronic programming guide, wherein the information that is associated with the electronic programming guide and the media stream associated with the selected media program are transmitted from the interface element to the server via a broadband communication link, wherein the controller element monitors for first navigation activity and second navigation activity, wherein the first navigation activity includes a pan adjustment of the slideable canvas in a direction within confines of the graphical user interface window in combination with actuation of a control element of the communication device, and wherein the second navigation activity includes user input of call letters corresponding with a programming channel to enable the slideable canvas to be adjusted to present a section of the electronic programming guide corresponding to the programming channel, and wherein the controller element transmits to the server updated information associated with the electronic programming guide responsive to detecting one of the first navigation activity or the second navigation activity.

18. The media receiver of claim 17, wherein the slideable canvas has a virtual view that is larger than the graphical user interface window presented at an Internet browser of the communication device, and wherein the slideable canvas corresponds to a matrix comprising a plurality of media program channels identifiers, a corresponding plurality of media programs for each of the plurality of media program channel identifiers, and a viewing time for each of the plurality of media programs.

19. The media receiver of claim 17, wherein the controller element transmits other information associated with a new electronic programming guide responsive to a request to present a different electronic programming guide to the portal, wherein the other information causes the portal to present in the graphical user interface window a second slideable canvas of the new electronic programming guide.

20. A gateway, comprising:

a controller element to provide a server, hosting a portal, access to an electronic programming guide supplied by a media receiver and access to a media stream associated with a selected media program that is supplied by the media receiver, wherein the access to the electronic programming guide and the media stream associated with the selected media program that are supplied by the media receiver is provided over a broadband communication link, wherein the controller element enables a server to present a graphical user interface window corresponding to a slideable canvas of the electronic programming guide for display by an Internet browser of a communication device requesting the electronic programming guide and the controller element enables the server to present the media stream for display by the Internet browser of the communication device;

wherein the controller element enables the server to monitor for first navigation activity and second navigation activity, wherein the first navigation activity includes a pan adjustment of the slideable canvas in a direction within confines of the graphical user interface window in combination with actuation of a control element of the communication device, and wherein the second navigation activity includes user input of call letters corresponding with a programming channel to enable the slideable canvas to be adjusted to present a section of the electronic programming guide corresponding to the programming channel, and wherein the slideable canvas of the electronic programming guide is adjusted about the graphical user interface window in response to detecting one of the first navigation activity or the second navigation activity.

21. The gateway of claim 20, wherein the slideable canvas has a virtual viewing larger than the graphical user interface window presented at the Internet browser, wherein the slideable canvas corresponds to a matrix comprising a plurality of media program channel identifiers, a corresponding plurality of media programs for each of the plurality of media program channel identifiers, and a viewing time for each of the plurality of media programs.

22. The gateway of claim 20, wherein the controller element provides the portal access to the media receiver responsive to the portal supplying valid authentication information to the controller element, and wherein communications between the media receiver and the portal are over a unicast channel of an interactive television system, wherein the media receiver accesses an interactive television system.

* * * * *